Jan. 27, 1959  L. DECKER  2,870,550
TOY EARTH SATELLITE
Filed Jan. 28, 1958

INVENTOR.
LAMBERT DECKER
BY
ATTORNEY

2,870,550
TOY EARTH SATELLITE
Lambert Decker, Ulster Park, N. Y.

Application January 28, 1958, Serial No. 711,683

8 Claims. (Cl. 35—46)

This invention relates to toys, and the main object of the invention is the provision of a new and improved toy which is both entertaining and educational and which embodies the idea of an artificial earth satellite.

A more particular object of the invention is the provision of a hollow globe, symbolizing the earth and made of relatively thin non-magnetic material such as a plastic, which is rotatably mounted on an axis thereof. Within the globe a shaft is rotatably mounted on another axis and has, integral or secured to the shaft at its midpoint, a diametrical rod preferably at right angles to the shaft. The extremities of the rod are provided with permanent magnets positioned close to but spaced from the inner wall of the globe. A ball or other small object of magnetizable material is provided for each magnet, positioned on the globe in alignment with the rod, whence the magnets, in an obvious manner, retain the balls in alignment with the rod and, upon rotation of the shaft within the globe the balls will follow the movement of the magnets and hence will orbit about the globe.

If the globe above mentioned is simultaneously rotated on its axis, which for further simulation of the earth may be considered the polar axis, then the path traced on the globe's surface by the moving balls will simulate the actual orbits with respect to the earth traced by the moving satellites.

Another object of the invention is therefore the provision of means for simultaneously rotating the globe and the said shaft.

Still another object of the invention is the provision of means for rotating the said shaft independently of the globe. When this is done the balls, or satellites, will follow a circular path about the globe along a great circle and thus show how the commonly held belief as to the orbit of a satellite is fallacious because the uninformed person fails to take into account the simultaneous rotation of the earth.

The above as well as additional objects will be clarified in the following description wherein reference numerals refer to like-numbered parts in the accompanying drawing. It is to be noted that the drawing is intended solely for the purpose of illustration and that it is therefore neither desired nor intended to limit the invention necessarily to the exact details of construction shown except insofar as they may be deemed essential to the invention as defined in the appended claims.

Referring briefly to the drawing, Fig. 1 is a vertical longitudinal sectional view through the toy.

Figure 1:
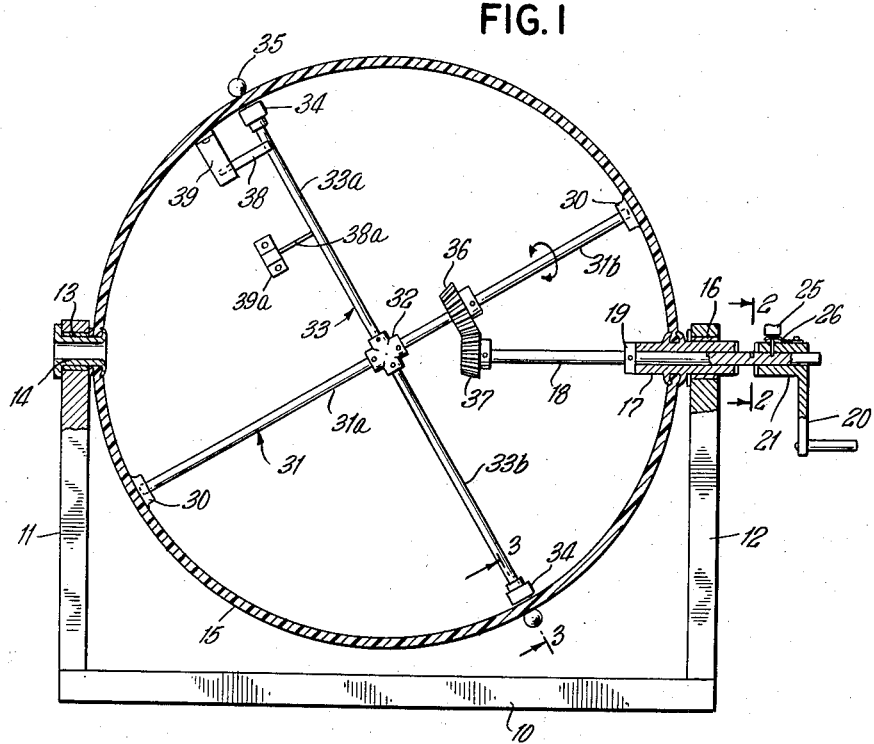
Figure 2:
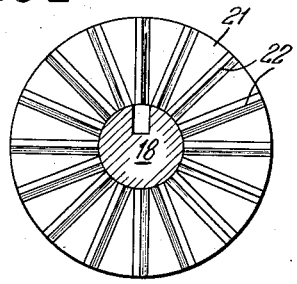
Fig. 2 is a sectional view taken on the line 2—2 of Fig. 1.
Figure 3:
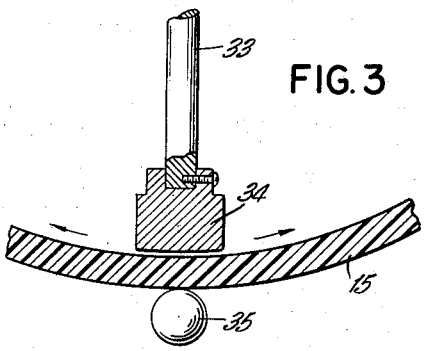
Fig. 3 is a sectional view taken on the line 3—3 of Fig. 1.
Figure 4:
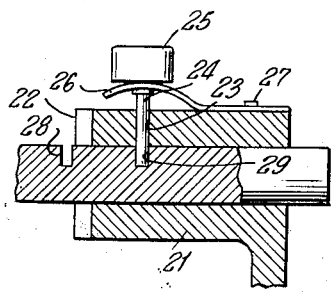
Fig. 4 is a fragmentary enlargement of Fig. 1.

Referring in detail to the drawing, the numeral 10 indicates a base having spaced pedestals 11 and 12 thereon. The pedestal 11 has a trunnion 13 in which a pin 14 is rotatable. This pin projects axially from a hollow globe 15 of nonmagnetic material, which may be one of the common plastics. The pin 14 is made rigid with the globe in any desired manner.

The pedestal 12 has a trunnion 16 aligned with the trunnion 13, in which a sleeve 17 is rotatably mounted. This sleeve is also made rigid with the globe in any desired manner, and extends through the globe. A shaft or stem 18 is rotatably mounted in the sleeve 17 and has a collar 19 restricting it from movement outward from the globe.

A crank 20 has a hub 21 slidably mounted on the outer end of the shaft 18. That surface of the hub 21 which faces the outer end of the sleeve 17 is serrated as shown by the serrations 22, and the opposite face of the sleeve 17 is likewise serrated. Thus, when the crank hub is slid into engagement with the sleeve 17, the opposed serrations will complementarily mesh so that, upon rotation of the hub by the crank the shaft 18 will be rotated.

The hub 21 is provided with a radial hole or passage 23 therethrough, in which a pin 24 is slidably mounted, the pin preferably having a wing-like head 25 so that it may be grasped by the fingers. Resilient means such as, for example, a leaf spring 26 anchored to the hub 21 at 27 and having the pin head secured thereto, normally urges the pin downward. Two longitudinally spaced holes or recesses 28 and 29 are provided on the shaft 17, into either of which the pin is adapted to register, in an obvious manner, when the hub 21 is positioned to align either hole 28 or 29 with the pin 24. The hole 28 is positioned to retain the serrations on the hub in mesh with those on the sleeve 17 when the hub is moved to the left, Fig. 1. In that position of the hub, it is apparent that turning of the crank will simultaneously rotate both the globe through the sleeve 17 and the shaft 18.

In order to rotate the shaft 18 independently of the globe, the crank hub 21 is moved to the right and positioned as shown in Fig. 1, with the pin 24 registering in the hole 29.

Aligned sockets or trunnions 30 lying on an axis of the globe displaced at an acute angle from the axis of rotation of the globe are secured to the inner surface of the globe. Preferably these axes are approximately twenty-three degrees apart. A shaft 31, which in Fig. 1 is illustrated as formed of two aligned sections 31a and 31b joined by a union 32, is rotatably mounted in the sockets 30. A rod 33, which in Fig. 1 is shown as composed of two sections 33a and 33b joined by the coupling 32, is thus rigid with the shaft 31 and, as shown, is positioned at right angles to the shaft.

At each extremity of the rod 33 a permanent magnet 34 is mounted closely adjacent the interior surface of the globe. The crank shaft 18 has a bevel gear 37 on its inner end, which is in mesh with a bevel gear 36 on the shaft 31. It is thus apparent that when the crank shaft is rotated the shaft 31 will rotate and carry with it the rod 33 and the magnets. If a ball 35 is placed on the globe in axial alignment with a magnet 34, the ball will remain in such aligned position regardless of the rotation of the globe with respect to the rotation of the shaft 31, as is well known, assuming of course that the speed of rotation is not too great. Using a single ball will illustrate the behavior of a single satellite, while using two balls, one aligned with each magnet, will illustrate the behavior of two satellites traveling at the same speed.

With the crank hub in the position shown in Fig. 1, turning of the crank will cause rotation of the shaft 31 alone, so that the ball or balls 35 will be carried over the surface of the globe in a great circle. However, with the crank hub positioned to engage the serrations thereof with the serrations on the sleeve 17, the hub and sleeve will be interlocked, not shown, so that turning of the crank will cause simultaneous rotation of the shaft 31 and the globe. As a consequence, the path of the ball will follow a path simulating the actual path of an earth sattelite around the earth.

If the surface of the globe is provided with a map of the world, the successive geographical positions of the sattelite over the earth's surface can be noted. This would add to the interest of the toy.

Although the disclosure above has been referred to as a toy, it is apparent that it may also prove to be a useful instrument for representing the movements of an earth sattelite.

As a further improvement, sound emitting means has been provided for the toy to simulate the "beeps" of Sputnik. In the form illustrated in Fig. 1, this means is represented by a reed 38 fastened at one end to a pedestal 39 secured to the globe's inner surface. The reed is positioned to have its extremity lie in the path of the moving rod 33 so that each time the rod passes the reed the latter will be sounded. By properly constructing the reed the emitted sound may be made to simulate a "beep." One or more sounding units 38a, 39a may also be provided circumferentially spaced from that first-mentioned, whence the frequency of the "beeps" per turn of the shaft 31 will be increased.

Thus a very practical educational toy has been provided, which is simple in construction and inexpensive in cost of manufacture.

It should be noted that when the crank shaft 18 and the sleeve 17 are interlocked, as above-mentioned, the two together constitute a unitary shaft, and it is further to be noted that the mutually opposed serrated ends of the hub 21 and the sleeve 17 constitute a clutch means.

Having thus described the invention, what is claimed and desired to be secured by Letters Patent is as follows:

1. A device comprising a base having two opposed pedestals provided with aligned trunnions, a hollow globe of non-magnetizable material having two diametrically opposed shafts rotatably mounted in said trunnions, a third shaft rotatably mounted within the globe on an axis of the globe at an acute angle to the axis through said trunnions, a rod secured to said third shaft at right angles thereto having a magnet on one end thereof positioned close to but spaced from the inner surface of the globe, at least one of said opposed shafts being fixed to the globe and extending from the outside of the globe to the inside thereof, intermeshed gear means partly on that portion of said one of said opposed shafts inside the globe and partly on said third shaft, means for rotating said one of said opposed shafts, and a magnetizable object adapted to be mounted on the globe in alignment with said magnet.

2. A device according to claim 1, said rod having a length greater than the internal radius of the globe and smaller than the internal diameter of the globe and having a magnet on the other end thereof positioned close to but spaced from the inner surface of the globe, and a second magnetizable object adapted to be mounted on the globe in alignment with said second-named magnet.

3. A device according to claim 1, said one of said opposed shafts being composed of two parts, one of said parts comprising a sleeve fixed to the globe, the other of said parts comprising an elongated shaft rotatably mounted in said sleeve and extending from both ends of the sleeve, the part of said gear means on said portion of said one of said opposed shafts inside the globe being mounted on said elongated shaft, said shaft rotating means including means for selectively rotating said elongated shaft alone and means for simultaneously rotating said elongated shaft and said sleeve.

4. A device according to claim 1, said one of said opposed shafts being composed of two parts, one of said parts comprising a sleeve fixed to the globe, the other of said parts comprising an elongated shaft rotatably mounted in said sleeve and extending from both ends of the sleeve, the part of said gear means on said portion of said one of said opposed shafts inside the globe being mounted on said elongated shaft, said shaft rotating means comprising a crank including a hub slidably mounted on the outer end of said elongated shaft, complementary clutch means on the mutually opposed ends of said sleeve and said hub adapted to be interengaged upon sliding said hub from a position spaced from said sleeve to a position in contact with said sleeve, and means for releasably locking said hub selectively in either of said positions.

5. A device according to claim 1, having sound emitting means positioned in the path of movement of said rod and including means for actuating the same by said rod.

6. A device according to claim 1, having a support secured to the inner surface of the globe near the path of movement of said rod, and a reed secured at one end to said support and projecting into said path.

7. A device of the class described according to claim 1, having means for emitting a sound at spaced intervals of time during movement of said rod in its path of movement.

8. A device according to claim 2, having sound emitting means positioned in the path of movement of said rod actuable by said rod in passing thereover.

References Cited in the file of this patent
UNITED STATES PATENTS

| | | |
|---|---|---|
| 1,195,420 | Tsuru | Aug. 22, 1916 |
| 2,801,496 | Borsos | Aug. 6, 1957 |

OTHER REFERENCES

| | | |
|---|---|---|
| 194,420 | Germany | Jan. 21, 1908 |